Sept. 20, 1949.　　　　A. L. DONOGH　　　　2,482,160
CHAFF AND STRAW RECEIVER AND COCKER
Filed March 17, 1948　　　　　　　　　　　　2 Sheets-Sheet 1

Inventor.
Andrew L. Donogh
By Egerton R. Case
Atty.

Sept. 20, 1949.　　　　A. L. DONOGH　　　　2,482,160
CHAFF AND STRAW RECEIVER AND COCKER
Filed March 17, 1948　　　　　　　　　　　　　　2 Sheets-Sheet 2
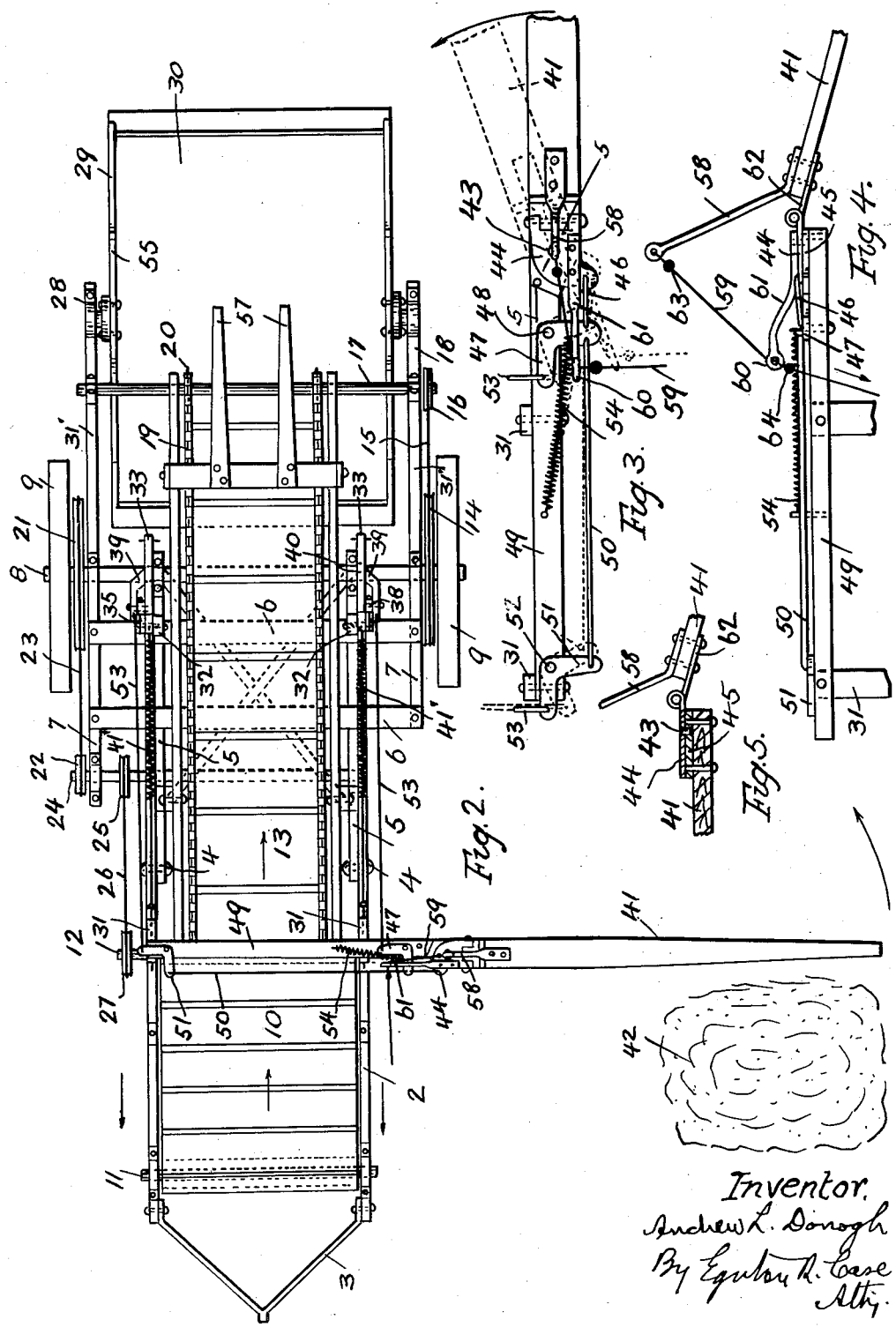
Inventor.
Andrew L. Donogh
By Egerton R. Case
Atty.

Patented Sept. 20, 1949

2,482,160

UNITED STATES PATENT OFFICE 2,482,160

CHAFF AND STRAW RECEIVER AND COCKER

Andrew Lee Donogh, Brandon, Manitoba, Canada

Application March 17, 1948, Serial No. 15,423

3 Claims. (Cl. 214—65)

1

This invention relates to harvesters of the class designed to be drawn behind a combine thresher to receive chaff and straw therefrom and deposit same in spaced piles or cocks, so thereby to facilitate the removal thereof from the field.

The principal objects of the invention are:

(1) To co-ordinate the movements of the implement to alternately automatically dump its loads in spaced relation, and reset itself to receive a load as it is drawn forward;

(2) To manually cause the implement to, at times, dump its load after which action it will automatically reset itself, and (3) To store up energy while a load is being dumped, to ultimately utilize this energy in re-setting the implement.

Other objects will be further set out in the specification.

The harvester comprises front and rear frames pivoted together normally in locked relationship in alignment; a conveyer mounted in each frame and adapted to convey the load to a drum or receiver having an open side journalled in the rear frame; a pair of ground wheels journalled in said rear frame, on the axis of which said rear frame is teetered, said wheels being used as a source of power to drive said conveyers; means to contact a cock; means whereby as said contact means is moved laterally by contact with said cock, the said frames are unlocked thus permitting the loaded drum to drop to the ground and be rotated to drop its load, the downward movement of said drum moving the pivoted ends of said frames upwardly, and means, as said ends are moving upwardly, to store energy which is ultimately utilized to re-set the implement after the drum has been relieved of its load and is returning to normal position.

Fig. 2 is a plan view of the implement.

Fig. 3 is a plan view of the mechanism which unlocks the front and rear frames either automatically or when actuated manually.

Fig. 4 is a side elevation of the parts shown in Fig. 3, and

Fig. 5 is a vertical section on the line 5—5, Fig. 3.

In the drawings like characters of reference refer to the same parts.

Figure 1:
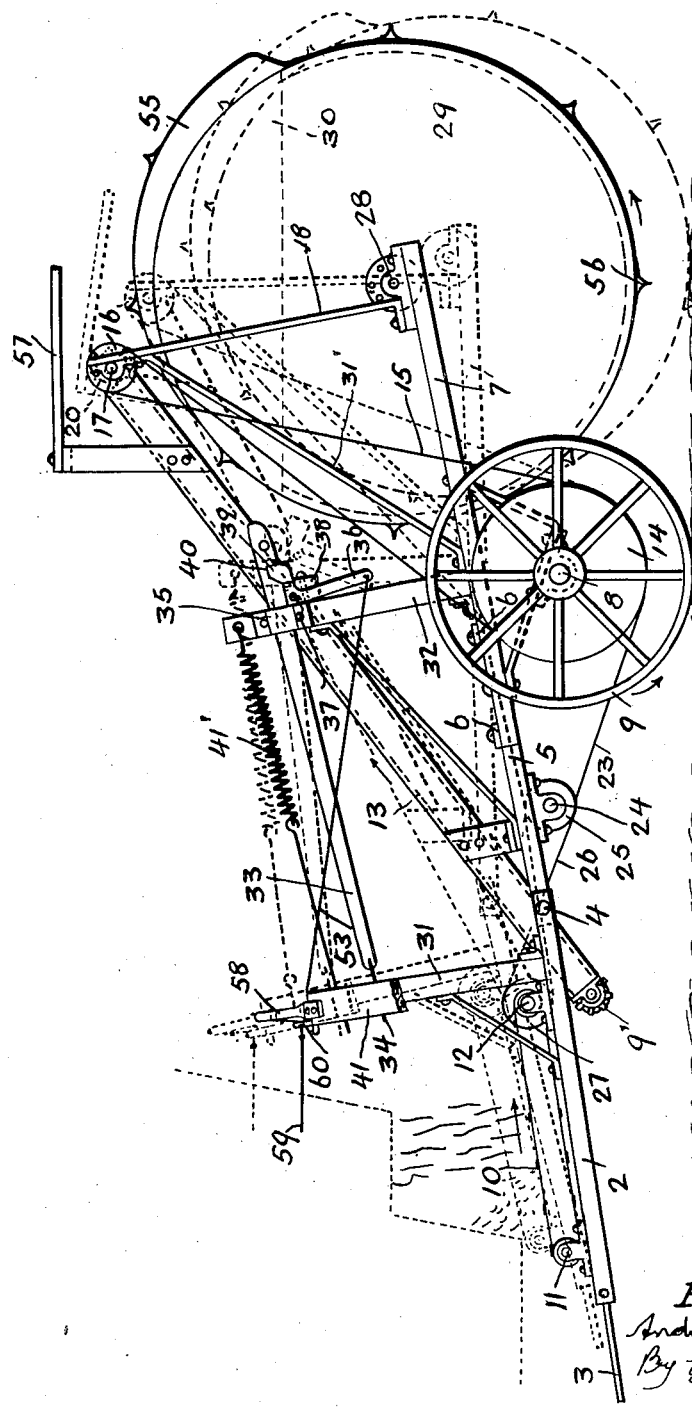
Fig. 1 is a side elevation of the implement with the drum in receiving position. This figure also shows the dotted positions of the various parts of the implement as the drum is dropping its load.

In operation this implement carries the chaff and straw directly from the shoe of the thresher and deposits same in the drum with the result that no feed value is spread around on the ground and lost. The implement is light in weight since canvas can be used largely in the making of the drum. No mechanism is used rotating the drum thus saving unnecessary weight. After the first round of the field has been completed, thus leaving the cocks in straight rows across the field, the implement will automatically trip and re-set itself. Up to that point the implement must be manually tripped.

The implement consists of a front frame composed of side bars 2 and a draw bar coupling 3, coupling the front ends of the bars 2, together and providing means whereby this implement is coupled to the combine thresher (not shown). The rear ends of the bar 2, are pivoted at 4, to the front ends of the side bars 5 of the rear frame. The side bars 5, are coupled together by the cross bars 6. These cross bars also couple together the side bars 7, of the rear frame. Suitably carried by the side bars 7, is a shaft 8, to which is keyed the ground wheels 9, which support the implement.

The conveyer 10, is supported on roller-provided shafts 11 and 12, carried by the side bars 2. The conveyer 10, is supported below the shoe of the thresher (Fig. 1) to receive its load. This load is carried and dumped on to a conveyer 13, suitably carried by and supported from the side bars 5. A pulley 14, is carried by the axle 8, at one side of the rear frame, and this pulley drives by means of the crossed belt 15, a pulley 16, carried by a shaft 17, mounted in the upper end of the conveyer 13, and also held by braced supports 18, carried by the bars 7. The sprocket chains 19, of the conveyer 13, pass over sprocket wheels 9', mounted on a shaft at the lower end of the conveyer 13, and are driven by the sprocket wheels 20 carried by the shaft 17. A pulley 21, on the shaft 8, drives a pulley 22 (by means of a belt 23), carried by a shaft 24, which is carried by one of the side bars 7, and also by the side bars 5. A pulley 25, on the shaft 24, drives by means of a crossed belt 26, a pulley 27, carried by the shaft 12. The mechanism described drives both conveyers simultaneously.

Mounted by means of the stub shafts 28, attached to the ends thereof, in the rear ends of the side bars 7, is a drum 29, having an open side 30 to receive the load. By any suitable means such as the bars 31', the supports 18, are braced. Carried by the side bars 2, and suitably supported therefrom are posts 31, which project above said side bars. Carried by the side bars 5, and suitably braced therefrom, are posts 32, which project above said side bars 5. These posts are in pairs at each side of the implement, and each pair carries a locking bar 33. Each locking bar is coupled at its forward end of a post 31, by any suitable means such as a bar 34. The rear end of each locking bar is held in place by a keeper 35, carried by a post 32, and slides between these members. Each locking bar 33, is provided at its rear end with means to lock therewith, while the drum is being filled. A suitable means for this purpose comprises a dog 36, pivoted at 37, to a block 38, carried by each post 32. The nose 39, of each dog engages in a correspondingly shaped notch 40, formed on the underside of each locking bar 33. Each pair of posts 31 and 32, is coupled together by a spring 41' in any suitable manner. The function performed by this spring or its equivalent is to store up energy while the drum is discharging its load. As before mentioned, the implement is designed to automatically dump its load when the drum has been loaded. Projecting laterally of the implement is a trip arm 41, the normal position of which is shown substantially in Fig. 4. As the implement is drawn forward, when said trip arm contacts a cock 42, it is moved in the direction indicated by an arrow in Fig. 2. This movement moves the trip-bar on the pivot 43, which pivots the plate 44 to the plate 45, which is bolted to the arm 41 (see Fig. 5). The plate 44, is coupled by a link 46 to a bell-crank lever 47, pivoted at 48, to a bar 49, carried by the posts 31. The bell-crank lever 47, is coupled by a link 50, to a bell-crank lever 51, which is pivoted at 52, to the bar 49. Each bell-crank lever 47 and 51, is coupled by a bar 53, to a dog 36, so that as these levers are moved the said dogs would be moved out of contact with the locking bars 33, with the result that the drum 29, will be carried by its load to move the rear frame around the axle 8, and cause the said front and rear frames to have relative movement on their pivotal connections 4. The result is that the parts are moved into the position shown by dotted lines in Fig. 1, and the springs 41', stretched. Immediately the drum 29, contacts the ground, it will be rotated and in due course will discharge its load through the open side 30. As the implement is carried forward, the drum will rotate and when completely emptied the energy stored in the springs 41', will move the various parts into positions shown by full lines in the drawings. By means of the spring 54, coupling the bell-crank lever 47, to the bar 49, after the trip arm 41, has functioned, this trip bar will be moved into normal position and the dogs 36, positioned to again engage with the locking bars 33, to lock the said front and back frames together.

To assist with the return of the various parts of the implement back to normal position, a cam 55, is secured to or formed a part of the ends of the drum 29. These cams are so shaped that as the drum is turned in discharging its load it will be gradually lifted upwardly and thus cooperate with the springs 41' for the purpose before mentioned. Any suitable lugs 56, may be carried by the drum to insure rotation thereof. 57 are bars supported from the upper end of the conveyer 13, to reduce as much as possible the action of wind currents against the straw being fed into the drum.

In order to manually trip the bar 41, any suitable means may be employed. A suitable means for this purpose comprises an arm 58, carried by the inner end of the trip arm 41. The cord 59, is coupled to the arm 58, and passes through an eye or a pulley 60, carried by the arm 61, supported by the plate 44, which is a leaf of a hinge which couples the trip arm 41, through the leaf 62, to the bar 49. This cord extends into convenient position for the operator. By pulling on the cord, he will raise the trip arm 41, vertically and when the stop 63, carried by the cord 59, comes in contact with the arm 61, said trip arm will be swung on its pivot 43, with the result that the dogs 36, will unlock the bars 33, and permit the drum to drop. Upon the operator releasing the cord, the spring 54, will return the arm 41, and its associated parts to normal position.

The stop 64, carried by the cord 59, will contact the arm 61, and hold the bar 41, in the desired angular position ready to be automatically tripped when it comes in contact with cock 42. It will be understood that the trip arm 41, does not rise each time the drum is dumped or emptied, when it is automatically operated.

From what has hereinbefore been set forth, it will be understood that the drum 29, be loaded so that the weight thereof will overbalance the strength of the springs 41', before the implement will move on the pivots 4. In other words, while the trip-arm 41, will each time it contacts a cock 42, actuate the mechanism to move the dogs 36, out of locking engagement with the locking bars 33, the strength of the springs 41', will prevent the relative movements of the front and rear frames on the pivots 4, until the drum has been given the required weight by its load.

While herein has been illustrated and described a preferred form of construction, it must be understood that various changes in construction may be made without departing from the spirit of this invention and the scope of the claims.

I claim:

1. In an implement of the class described, the combination of front and rear frames pivoted together at their adjacent ends; a truck on which said rear frame is mounted to teeter; an open-sided drum journalled in said rear frame; means driven by said truck to feed chaff and straw into said drum; releasable means to keep said frames normally in alignment and hold said drum above the ground, a trip-arm pivotally supported by said front frame and normally extending laterally of the implement; means carried by said frames to normally lock them in alignment; springs dominating said locking means, and means intermediate said arm and said locking means whereby when said arm contacts a cock said locking means will be moved out of locking position and permit the loaded drum to drop and move said rear frame on said truck to move said frames out of alignment thereby storing energy in said springs, and a pair of cams carried by said drum adapted to co-act with said springs as said drum is rotated to restore the various parts of the implement to normal position.

2. In an implement of the class described the combination of front and rear frames pivoted together at their adjacent ends; a truck on which said rear frame is mounted to teeter; an open-sided drum journalled in said rear frame; means driven by said truck to feed chaff and straw to said drum; locking means carried by said frames to normally hold said drum above the ground and said frames in alignment; springs normally dominating said locking means, and means extending laterally from the implement and adapted when contacting a cock to release said locking means to permit the weight of the loaded drum to move it to the ground while overcoming the resistance of said springs and permit said frames to be moved on their pivotal connections and store up energy in said springs to be utilized to lift said drum into normal position while moving said frames and locking means also back to normal position.

3. In an implement of the class described the combination of front and rear frames pivoted together at their adjacent ends; a truck on which said rear frame is mounted to teeter; a conveyer carried by said front frame; a conveyer carried by said rear frame; means driven by said truck to operate said conveyers; a drum, provided with an open side, journalled in said rear frame; locking means carried by said frames and normally retaining same in alignment to normally keep said drum above the ground; means carried by said front frame adapted to contact a cock to trip said locking means to permit the weight of the loaded drum to drop it to the ground and thereby move said frames on their pivoted connections, and means in which energy is stored when said frames are initially moved on their pivoted connections to lift said drum and simultaneously move said frames to normal positions and restore said locking means to normal positions to lock said frames and drum in normal positions.

ANDREW LEE DONOGH.

REFERENCES CITED

The following references are of record in the file of this patent:

UNITED STATES PATENTS

| Number | Name | Date |
| --- | --- | --- |
| 806,069 | Depew | Nov. 28, 1905 |
| 1,078,468 | Sumwalt | Nov. 11, 1913 |
| 1,197,762 | Pitts | Sept. 12, 1916 |
| 2,234,081 | Nebuda | Mar. 4, 1941 |
| 2,298,566 | Johnson | Oct. 13, 1942 |
| 2,453,384 | Renken | Nov. 9, 1948 |